United States Patent
Perras et al.

(10) Patent No.: US 9,428,202 B2
(45) Date of Patent: Aug. 30, 2016

(54) TRAIN SAFETY SYSTEM

(71) Applicant: VIA Rail Canada Inc., Montréal (CA)

(72) Inventors: Claude Perras, Oka (CA); Leigh Thorpe, Ottawa (CA); Francois Blouin, Gatineau (CA)

(73) Assignee: Via Rail Canada Inc., Montreal, Quebec (CA)

( * ) Notice: Subject to any disclaimer, the term of this patent is extended or adjusted under 35 U.S.C. 154(b) by 134 days.

(21) Appl. No.: 14/466,000

(22) Filed: Aug. 22, 2014

(65) Prior Publication Data

US 2015/0291193 A1    Oct. 15, 2015

Related U.S. Application Data

(60) Provisional application No. 61/979,692, filed on Apr. 15, 2014.

(51) Int. Cl.
| | |
|---|---|
| *G05D 1/00* | (2006.01) |
| *B61L 25/02* | (2006.01) |
| *B61L 15/00* | (2006.01) |
| *B61L 27/00* | (2006.01) |
| *G01S 19/14* | (2010.01) |
| *B61L 23/00* | (2006.01) |

(52) U.S. Cl.
CPC .......... *B61L 25/025* (2013.01); *B61L 15/0027* (2013.01); *B61L 15/0072* (2013.01); *B61L 27/0022* (2013.01); *B61L 27/0027* (2013.01); *G01S 19/14* (2013.01); *B61L 23/00* (2013.01)

(58) Field of Classification Search
None
See application file for complete search history.

(56) References Cited

U.S. PATENT DOCUMENTS

| | | | |
|---|---|---|---|
| 2009/0146846 A1* | 6/2009 | Grossman | B60R 25/04 340/988 |
| 2012/0033123 A1* | 2/2012 | Inoue | G08G 1/04 348/333.13 |
| 2014/0218218 A1* | 8/2014 | Lloreda | E05B 39/005 340/989 |

* cited by examiner

*Primary Examiner* — Adam Alharbi
(74) *Attorney, Agent, or Firm* — Nixon Peabody LLP

(57) ABSTRACT

A method and system for assisting the safe operation of a train adapted to be operated by a locomotive operating crew comprises generating GPS-located critical information at a central location, the GPS-located critical information being based at least in part on one or more railroad maps and one or more train dispatcher information systems; monitoring the real-time location of the train with a GPS device on-board the train; and generating alerts for the locomotive operating crew based on the GPS-located critical information and the real time location of the train, so that the crew is alerted as to upcoming changes to be implemented.

17 Claims, 14 Drawing Sheets

500

TGBO CONFORMITY VERIFICATION SCREEN
DO NOT OPERATE SYSTEM IF TGBO IS MISSING OR ERRONEOUS

CANADIAN NATIONAL RAILWAY                                          VERIFIED

FRIDAY JANUARY 31,2014                                                    X
TGBO No 1676                                                              X
TO: NO 59 AT: VIA MONTREAL (OTTAWA)                        X

APPLICABLE ON: ST-HYACINTHE SUB MILE 74.25 TO 70    X
MONTREAL SUB MILE 1.2 TO 11.6                              X
KINGSTON SUB MILE 10.3 TO 42                               X
ALEXANDRIA SUB MILE 0.0 TO 0.4                                            X
VALLEYFIELD SUB MILE 45 TO 47.2                                           X

502

TOTAL OF 5 GBOs

| ITEM | GBO No. | VERIFIED |
|------|---------|----------|
| 1    | 2401    | X        |
| 2    | 1216    | X        |
| 3    | 1765    | X        |
| 4    | 2438    | X        |
| 5    | 1245    | X        |

Manual Restriction Input Screen

Location Identification

Subdivision: Alexandria
MP: 15.4
Station: Glenn Robertson
MP from: _____ to: _____

| North Switch | East Switch | West Switch | South Switch |

- STOP
- Stop & Protect Highway Xing
- Stop until call foreman
- Call RTC Report Switch
- Obstruction on Track

- Call Foreman Leaving Limits
- Call RTC
- Call SM
- Trespasser on or near track
- High Water
- Slippery Rail

| 5 mph | 50 mph |
| 10 mph | 60 mph |
| 20 mph | 70 mph |
| 30 mph | 80 mph |
| 40 mph | 90 mph |

FIG. 7

TRAIN SAFETY SYSTEM

CROSS REFERENCE TO RELATED APPLICATIONS

This application claims the benefit of U.S. Provisional Application No. 61/979,692, filed Apr. 15, 2014, which is hereby incorporated by reference herein in its entirety.

FIELD OF THE INVENTION

The present disclosure relates to railway systems and, more particularly, to a train safety system.

SUMMARY

In accordance with one embodiment, a method of assisting the safe operation of a train adapted to be operated by a locomotive operating crew comprises (a) generating GPS-located critical information at a central location, the GPS-located critical information being based at least in part on one or more railroad maps and one or more train dispatcher information systems; (b) monitoring the real-time location of the train with a GPS device on-board the train; and (c) generating alerts for the locomotive operating crew based on the GPS-located critical information and the real time location of the train, so that the crew is alerted as to upcoming changes to be implemented.

In accordance with another embodiment, a safety system safety system for a train having a locomotive operating crew comprises (a) a database containing one or more railroad maps and one or more train dispatcher information systems; (b) a central server adapted to be at least intermittently coupled to the database to generate GPS-located critical information; (c) a GPS device on-board the train to monitor the real-time location of the train; and (d) a computer on-board the train and adapted to be at least intermittently coupled to the central server and the GPS device for executing an application utilizing the GPS-located critical information and the real-time location of the train, wherein the application generates alerts for the locomotive operating crew based on the GPS-located critical information and the real time location of the train, so that the crew is alerted as to upcoming changes to be implemented.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

FIG. 5 is the TSS Application Conformity Verification Screen.
FIG. 7 is the Manual Restriction Input Screen.

Figure 1:
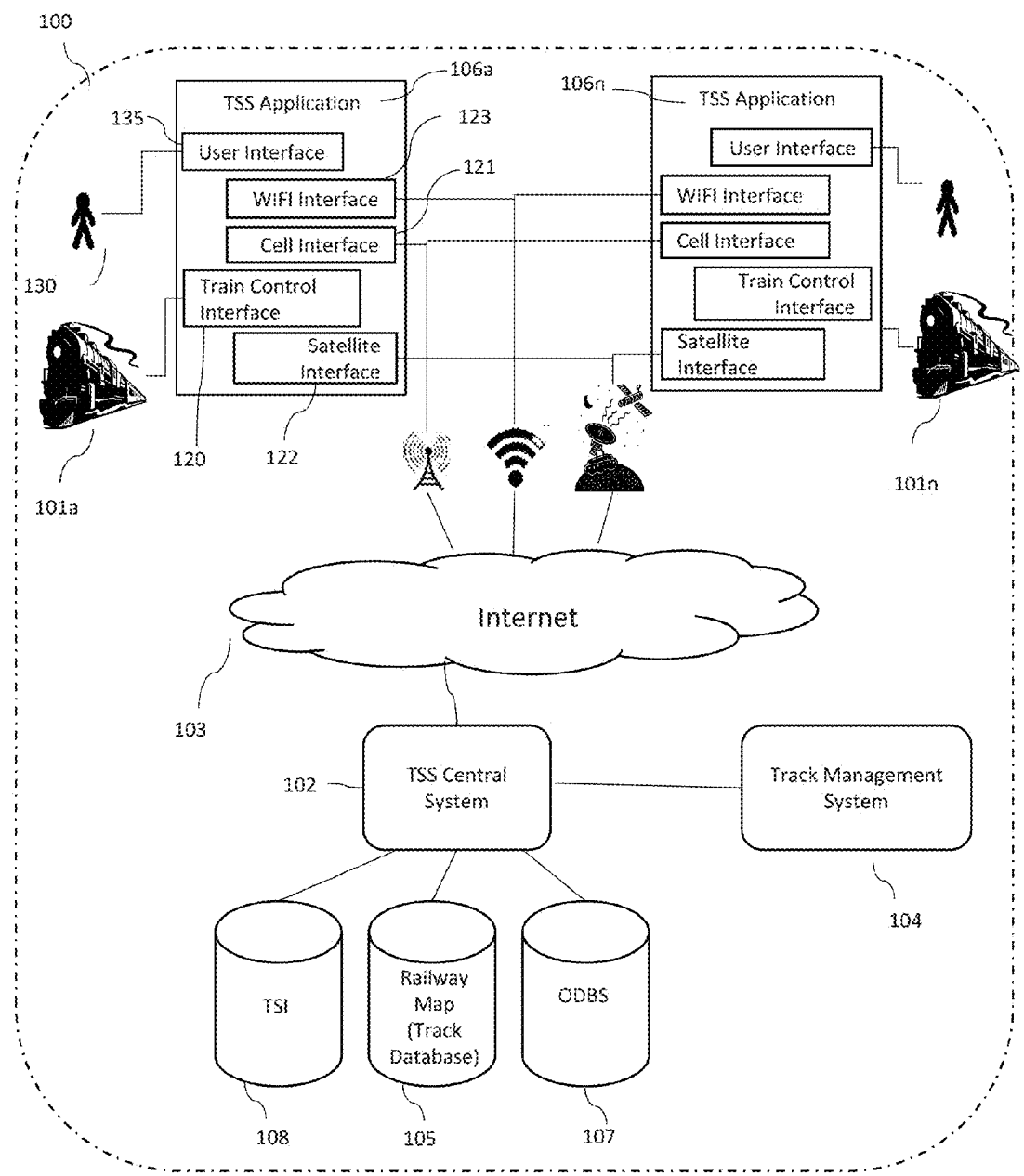
FIG. 1 is the Train Safety System overview.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The Train Safety System (TSS) is a system designed to help the locomotive operating crew (LOC) (comprising In-Charge Locomotive Engineer, Locomotive Engineer, train driver, train conductor or train driver assistant, train driver trainee, or any person involved in operating the train) with driving the train and to reduce the risk of losing geographical reference (being unsure of the location of the train along the route), missing a signal, over speeding, or losing track of any other restriction (i.e., work zone, authority limits), any of which could lead to a severe accident. The system can be classified as a safety overlay on the existing railway operating procedures and safety systems and can be deployed without requiring additional capabilities on the railroad infrastructure (e.g. new transponders). The system is based on ICT (Information and Communication Technology). The system applies ICT and human factors design to reduce the cognitive and memory demands on the locomotive driver, as well as to mitigate the consequences of human error in the operation of the train.

Referring to FIG. 1, the TSS 100 comprises a Central System or central information server 102 communicating with one or more trains 101*a* . . . 101*n* over the Internet 103 or private data network. Each train 101*a*, 101*b* . . . 101*n* is equipped with one or more in-cabin devices executing the in-cabin TSS application 106*a* . . . 106*n*. The TSS Application 106*a* . . . 106*n* uses one or more wireless interface(s) 121, such as cellular (3G, 4G, LTE or other cellular data communication capability), WIFI or a satellite interface 122, or a combination thereof to connect to the Internet 103 or any other means of connecting to the Internet 103. The TSS Application 106*a* . . . 106*n* may include a train control interface 120 to optionally perform functions directly on the train controls. The central information server 102 interfaces with existing track management systems 104. In order to work on different railways, independent of the railroad infrastructure, including where the trip crosses railway jurisdictions, the TSS 100 uses a database 105 (track database) containing a detailed base map of the contemplated railways, a geo-positioning (GPS coordinates) along with associated milepost of all the elements which could affect the movement of trains, a braking calculator, and a set of predefined alerts. The TSS central information server 107 retrieves, stores, and updates operational information 107 such as the Railway Operating Rules, General Bulletin Orders (GBO), Tabular General Bulletin Orders (TGBO), Daily Bulletin Orders (DBO), Daily Track Bulletin, and any other types or rules and bulletins applicable to a given railway system and applicable restrictions for train operations. A General Bulletin Order provides operating guidelines (e.g., speed restrictions for a particular stretch of track, a notice of the presence of track workers at a particular milepost) for a train or engine. A Tabular General Bulletin Order provides, in a tabular format, all the GBOs that apply to a specific train or engine along a specified section of its route. The system aligns the mile post information in the operating timetables, bulletins and orders with the corresponding GPS coordinates using the railway map to generate GPS-located critical information. The conversion can be done in the TSS application or in the TSS central system. The GPS-located critical information can then be tracked by the GPS device located on the train without requiring further connectivity with the central server.

The TSS Application 106 provides a LOC 130, via a graphical user interface (GUI) 135, with an interactive networked data communications and display system in the locomotive cabins. The GUI 135 shows location, speed, guidance, automated alerts, and other timely information needed in the course of locomotive operation. The LOC has all the information required to fulfill their duties in the safest way possible, delivered to them as it becomes relevant to the operation of the train.

The system is capable of activating train-braking systems (for example penalty brakes—an automated train braking system that can be engaged in pre-determined circumstances to over-ride the manual controls and gradually stop the train in a safe and controlled manner) in the event that the LOC fail to follow established railway operating procedures, providing an enhanced fail-safe function for the operation of locomotives. This capability greatly reduces the risk of human error resulting in a catastrophic outcome.

As per FIG.1, the primary information feeds required for TSS are the GBOs and TGBOs provided by train dispatchers. The TSS central system receives XML documents from the train dispatchers, parses the contents, stores the information in the database, and provides the information to the pertinent TSS Application devices. The train dispatchers also provide operating timetables which provide information on permanent speed restrictions and what radio frequencies should be used for a given track segment.

Figure 2:
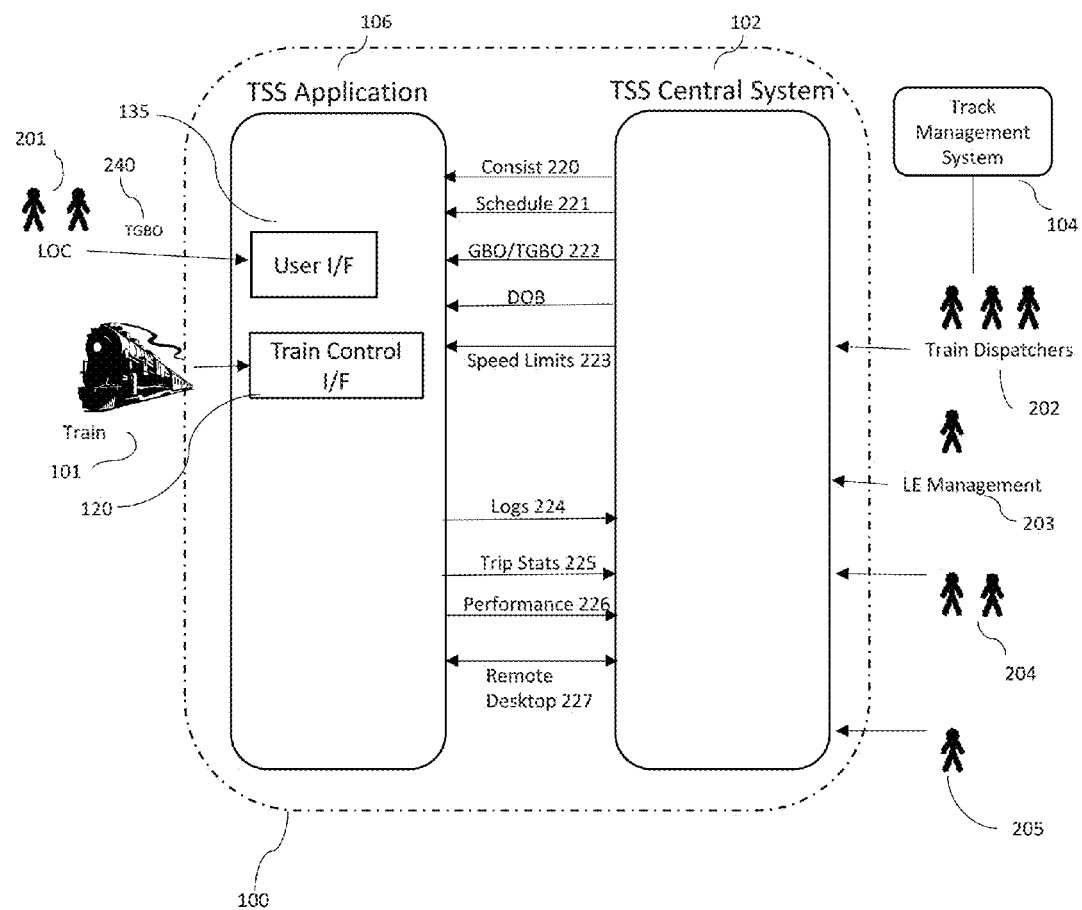
FIG. 2 is the Train Safety System context diagram.

As per FIG. 2, users of the system may comprise:
Locomotive Operating crew (LOC) 201
Dispatchers and train operations teams 202
LOC Management 203 and train operators' Safety and Security teams 204
Administrators to update system information (rail database, operating rules, etc.) 205

The TSS 100 is connected to the train dispatcher back-end system 104 using machine-to-machine communication to extract real-time train route, crossover, switch position, and other information that further enhances the ability to predict, avert, and detect human procedural errors and increase interactivity response validation.

Before the crew is on duty, the GBOs are pushed to an on-board computer running the TSS Application 106a . . . 106n. This punctual information is added to that already included in the base map. The train consist information (locomotives and cars numbers, length, type and weight) is pushed to the system allowing it to calculate, for example, braking curves.

When the crew 130 reports for duty they get a copy of a TGBO 240 for their train, perform their briefing and all other preparatory duties as they do today. Then they go to the train, and perform all the required tests and inspections as today.

The TSS Application 106 is similar to a GPS device for automobiles that displays a map with the location of the train relative to pertinent signals, crossings, etc., and provides guidance to the LOC 130. The TSS Application provides a GUI 135 that informs LOCs of applicable speed limits, radio frequencies for communications with train dispatchers, information from published timetables, and other pertinent operating information. It also provides the option to display an animated map displaying the position of the train relative to upcoming switches, signals, crossings, hot box detectors, dragging equipment and any other pertinent waypoint or control point information using both text and graphics. The application 106 also provides audible cues to ensure the LOC is alerted to essential information, such as a change in the speed limit. LOCs also have the ability to interact with the application 106 using an optional touch screen, and the application 106 is capable of recording audio responses from the LOC, minimizing or avoiding the need for the LOC to type information or to write notes, as is currently done.

The TSS Application 106 provides timely information and alerts to the LOC to raise awareness of approaching signals, speed limit changes, waypoints/control points, etc. This information facilitates the work of the LOC, enabling them to focus their attention on appropriate locomotive operations.

As per FIG. 2, information is fed to the TSS from different sources, comprising:
1) train dispatchers 202
2) operating timetable (paper-based)
   i) Provides information regarding radio frequencies to be used within specific subdivisions
   ii) Entered into TSS manually
   iii) Need to track all changes made.
3) TGBOs and GBOs (sent per train) 222
   i) Provided as a direct information feed from source train dispatcher systems
4) Train Schedule 221
   i) Train #
   ii) Origin, Destination
   iii) Scheduled departure time
5) Locomotive and consist assignments 222
   i) Provides locomotive ID and train cars are assigned to each scheduled train (train number). Includes specific equipment type information.
6) Web Service provides arrival time information to the TSS Application to pass on to the LOC.

Figure 3:
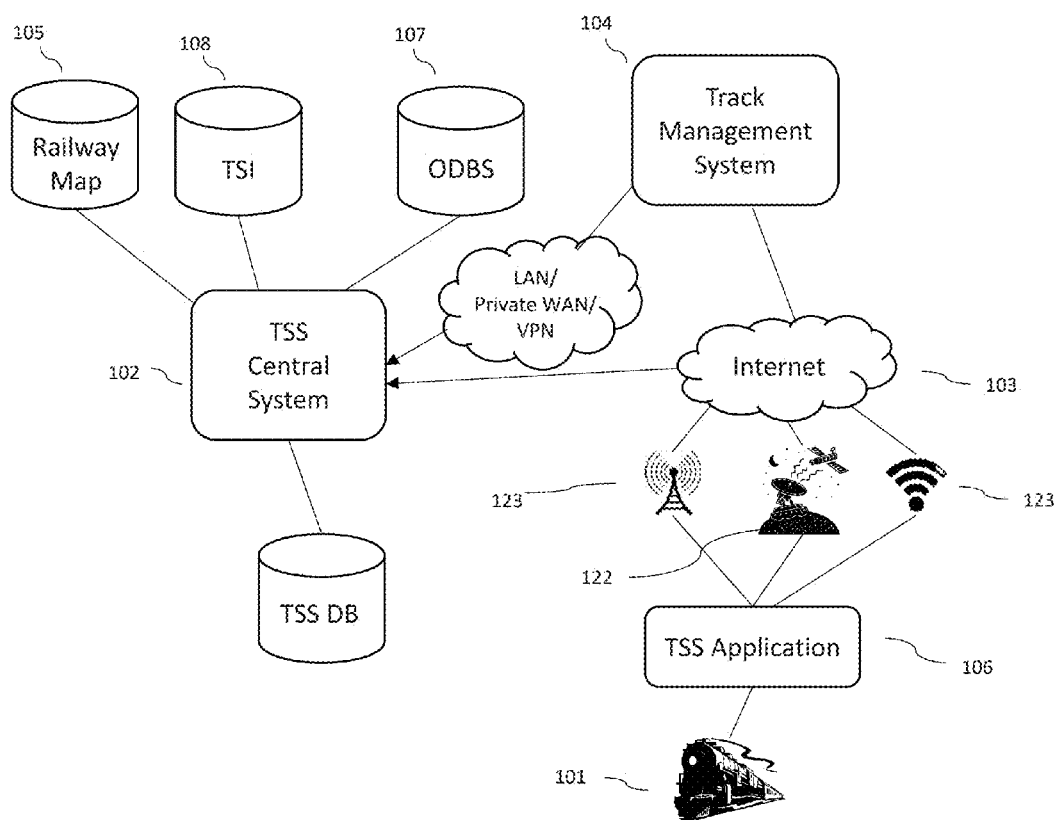
FIG. 3 is a conceptual view of the Train Safety System.

FIG. 3 shows the TSS Application computer deployed within the locomotive, with interfaces to GPS and specific locomotive control systems. The diagram also highlights the TSS central server, which receives information from numerous sources, including train dispatcher systems and TSS Application operational systems such as Operations Database System (ODBS) and possible Train Schedule Information (TSI) and Business Intelligence (BI) systems. Databases detailing map components of all the pertinent train track locations 105 where the TSS Application operates are stored and maintained up to date within the TSS central system 102. The information relevant to a particular train is downloaded as the train is preparing to begin its run, and is stored by the TSS application local database. The TSS central system 102 periodically synchronizes applicable updates to the TSS applications. The systems communicate leveraging Internet connectivity over cell and/or satellite channels. The central system 102 communicates with the track management system 104 using a Virtual Private Network (VPN), a private Wide area Network (WAN) connection or a Local Area Network (LAN) connection.

The train dispatchers provide GBO and TGBO information in the form of an XML file. The TSS central system has the capability to receive the GBO and TGBO messages, parse the XML data to manage within the database, and then synchronize the data with the TSSs. This data includes pertinent train operations information such as: applicable speed limit; applicable location (mile post), date and time of speed restrictions which are translated into GPS-located critical information; and track maintenance procedures.

Operations timetables provided by train dispatchers are entered into the TSS manually with a database editor. In embodiments, the system is designed to facilitate adding information feeds from train dispatchers throughout the system evolution.

ODBS (Operations Database System) stores information regarding train schedules along with locomotive and consist assignment information. For each train number, a locomotive and consist are assigned. While the assignments are typically done well in advance, changes can be made last-minute due to changes in operational requirements or equipment maintenance issues. ODBS is the operator's application for managing rolling stock, specifically managing locomotive and consist information for each train. The information in the ODBS required by the TSS includes train schedules with equipment assignments per train, including what locomotives and consist are assigned to each scheduled train.

The TSS receives the schedule and equipment assignment information from ODBS in a timely manner, updates are received often, for example, every 15 minutes. This assures that last minute changes are effectively captured. ODBS interfaces are typically done using file transfer (FTP) solutions. This information may be more easily accessible from ODS/BI systems that are currently being implemented.

As per FIG. 3, the TSS Application provides bi-directional data communication interfaces for Internet access comprising for example one or more of:
1. WiFi interface
2. Cellular data communications interface (such as 3G or LTE)
3. Satellite data wireless interface The TSS Application uses Internet access to establish connectivity to the TSS central systems. The failover between network access types is automatic.

As there remains a risk of losing connectivity, the TSS Application design takes into consideration that the complete functionality be available when network connectivity is interrupted. A local database for operational information management is used.

Some facilities, like train and refueling stations or maintenance centers, are equipped with private WiFi Access Points. This communication path is detected and used when available. All data bulk transfer should take advantage of this connectivity in order to reduce operational costs.

If no communication facilities are available, TSS Application-generated data is then stored on the device to maintain full functionality without connectivity. Sufficient hard drive space for at least one week of data storage is required.

All communication sessions (WiFi, HSPA/LTE or Satellite) are established with a secure and authenticated process (e.g.: SSL or IPsec VPN).

An interface is used between the TSS Application and the GPS installed in the locomotive. The interface provides the TSS Application with precise location information at a frequency of no less than once per second (1 Hz).

The TSS Central System receives information feeds from each of the train dispatchers managing rail used by the operator. While the primary requirement is to receive GBO and TGBO files from the dispatcher systems, development requires two-way messaging between TSS and the train dispatchers. The TSS central system also interfaces with specific operations systems, including ODBS and a TSI.

In some embodiments, the GUI 135 of the TSS Application 106 comprises:
Login page 400 (FIG. 4):
   a. System status (users logged in, system availability, back office connectivity, updates pending)
   b. Basic train and operating information on the login screen (date/time, time zone, train equipment type, train locomotive ID, locomotive type, train consist, subdivision name, radio channels)
TGBO conformity screen 500 (FIG. 5):
   a. TGBO header
   b. GBO numbers
   c. Check boxes next to each GBO number (LOC input)
Main operating screen (FIGS. 6A and 6B)—see below.
Manual restriction input screen 700 (FIG. 7)
   a. TSS Application warns crew on the approach of these points
   b. Orange and red buttons generate a reminder on the screen with an audible warning or alarm
   c. Yellow with speed values select a speed change on the speedometer and activate the speed logic of the speedometer
   d. The screen colors/brightness can be toggled between day and night settings.

To operate across multiple railways, the TSS 100 uses a detailed base map of the routes, a sufficiently precise geo-positioning of all the elements that affect the movement of trains, all the applicable GBOs, a set of predefined alerts (visual and audible) and finally an enhanced speedometer display. Thus there is no need for additional capability to be deployed on the physical train track system.

The GBOs are pushed to the on board computer, the timely information is added to the elements already included in the base map. The train consist information (locomotives and cars numbers, length, type and weight) is pushed to the system.

Figure 4:
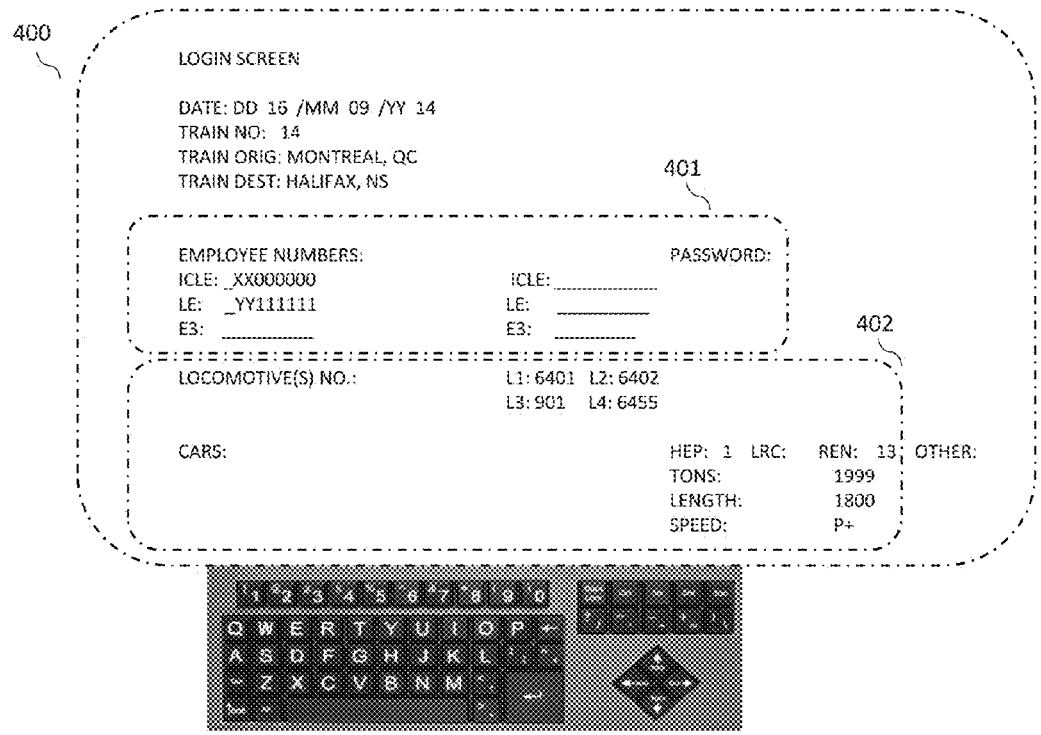
FIG. 4 is the Train Safety System Application Initialization Screen.

As per FIG. 4, the login screen 400 allows the LOC 130 to log in with a user name and password. A verification of the actual (paper version) consist information versus the information present in the TSS Application is necessary in order to ensure that the various vectors are accurate.

As TGBO information is vital to the safe operation of the train, the LOCs validate that the TGBO information loaded and presented by the system is consistent with the TGBO paper copies produced for the LOCs following the current process. As per FIG. 5, using the TGBO conformity screen 500, the LOCs 130 also compare the paper copy of the TGBO with the version contained in TSS Application. A text box showing the last update date and time for the TGBO is included to the TGBO conformity screen. When the TGBO information is not 100% complete and accurate, the LOCs do not use the system during the trip. In some cases of a TGBO inconsistency, it may be possible for TSS to request a correction so that TSS may be used during the trip.

Once the TGBO conformity verification is complete, the primary system display is visible. Optionally, the map animation option may not be available when in the vicinity of major train stations, due to the complexity of managing a large number of diverse tracks.

Figure 6A:
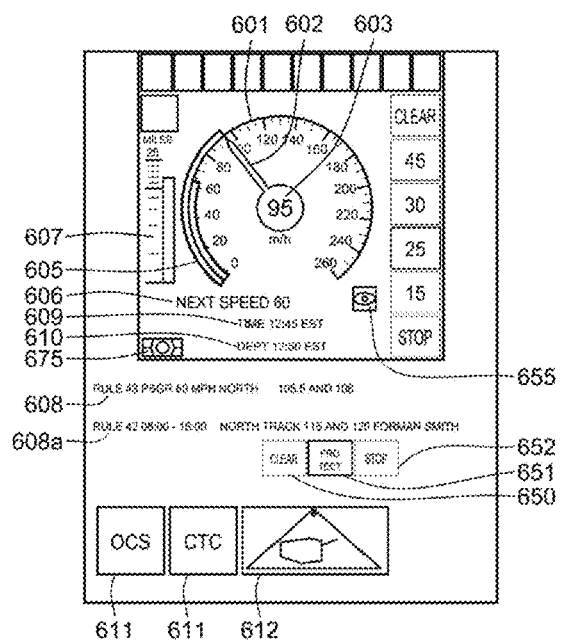
FIG. 6A shows a TSS Application primary operating display.
Figure 6B:
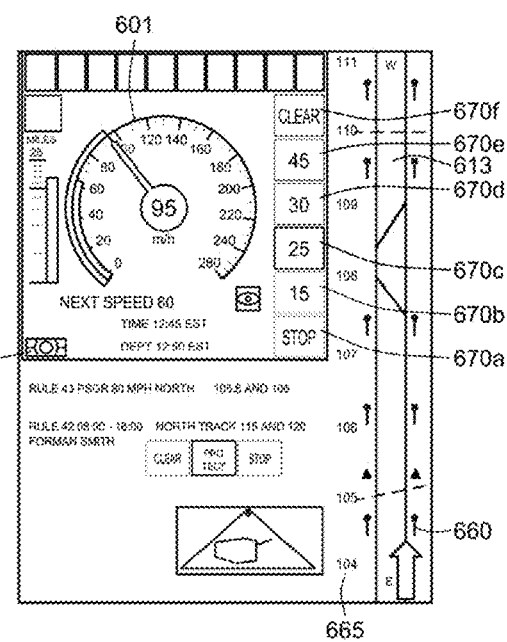
FIG. 6B shows a TSS Application primary operating display.

FIG. 6A shows an example of a main trip operation screen. FIG. 6B shows an example of the main trip operation screen with a rolling map 613. The following information is an example of what can be provided on the trip operation screen.

1. Speedometer 601
   a. The needle 602 points to the current speed (in MPH or KM/h) of the train in an analog fashion. The needle may optionally be colored.
      i. If the maximum allowable speed is exceeded by a pre-determined margin (e.g. 1-4 MPH), the needle may change color (e.g., orange) and an audible alert is initiated.
      ii. If the maximum allowable speed is exceeded by a pre-determined minimum (e.g. 5 MPH or more), a loud audible alarm is initiated, and the needle may turn red.
         1. Optionally exceeding the allowable speed by more than a pre-determined margin (e.g. 5 MPH) triggers penalty brakes.
   b. The numerical reading in the centre 603 displays the current speed (in MPH)
   c. The green bar 604 around the outside of the speed dial displays the current permissible speed (in MPH)
   d. The yellow bar 605 around the outside or inside of the speed dial shows the next permissible speed (in MPH)
   e. The Next Speed text in yellow 606 below the speedometer displays the next permissible speed numerically.
2. Distance Bar 607
   a. Displays the distance to the location/milepost where the speed limit changes. The solid bar gets smaller (descending) as the train approaches the location.
3. Penalty Brake Indicator 675
   a. Display when the penalty brake has been applied
4. System State Indicator 655
   a. Indicator shows whether the system is fully operational or is limited in some way.
5. Present Time 609 and Time Zone
   a. Displays time and applicable time zone information.
6. Departure Time 610
   a. Displays scheduled departure time from the next station.
7. Control Buttons
   a. Miscellaneous control buttons allowing users to:
      i. switch screens
      ii. active/deactivate options (e.g. map, day/night screen mode, automated whistle mode, etc.)
8. GBO List 608, 608a
   a. A scrolling list of GBOs updated as the train progresses so the information is presented when needed.
   b. Font is appropriate color and may flash as required based on visual alert setting.
9. When Approaching Working Party Authority Limits (Planned Protection Rule)
   a. Appears in the scrolling list of TGBO entries.
   b. Provides buttons enabling LOCs to enter required actions (STOP 652, PROTECT 651, CLEAR 650). Each of a two-man crew must enter the same selection.
   c. Details for LOCs and TSS with respect to working party authority limits are as follows:
      i. Before passing yellow over red signal flags, permission must be obtained from the foreman named in the GBO. If permission is received to pass with no restriction, the CLEAR button is pressed by the LOC, the highlighting on GBO text is removed, and the train is then operated at the normal speed permissible for that section of the track.
      ii. If permission from the foreman named in the GBO contains restrictions, the yellow button is pressed by the LOC, TSS lets the train operate manually so the LOC can move according to restrictions, and the GBO visual alerting continues until the train has cleared the limits of the working party authority.
      iii. If permission has not been obtained from the foreman named in GBO then red button (STOP) is pressed by the LOC. The TSS requires that the train be brought to a stop before the red signal flags.
         1. If the deceleration rate of the train is too slow as estimated by the braking calculator, an audible alarm sounds for a pre-determined number of seconds (typically 7 seconds),
         2. If by then the deceleration rate is still too slow, a louder audible alarm sounds;
            a. Optionally, this may trigger an application of penalty brakes and disables power control.
      iv. If conditions change, the system can be reset to another of the three options if the LOC press matching buttons.
10. Control Method Changes 611
    a. The OCS or CTC or interlocking icon displays when arriving within a predetermined number of miles of a territory limit (typically 2.25 miles) where the control method changes.
       i. LOCs are required to acknowledge the change by pressing the CLEAR button to the right side of the speedometer
          1. Failure to acknowledge triggers a visual and continuous audible alarm.
          2. After a certain number of seconds following the audible alarm, penalty brakes are applied and power control disabled.

As the train proceeds, the TSS shows the train progression on the optional rolling map 613. The map is visible on one or more screens at the option of each user, e.g., users may find it helpful in cases where visibility is reduced by fog, snow or other conditions. When the train approaches a block signal 660, the LOC interprets the signal and presses on the speed 670a . . . 670f associated with the signal. The train braking system can adjust the braking curve accordingly. The application is aware of the location of block signals and it can detect if the LOC has not pressed a speed when approaching a signal. An alarm can be triggered to indicate to the LOC that a block signal needs to be interpreted.

Optionally, a rolling map like that shown on the right side of FIG. 6B may be displayed. The map may include:

1. A simple track diagram representing main tracks with a 4-to-5 mile look-ahead
2. Name of subdivision
3. Cardinals points (map orientation), with direction based on operating timetable
4. Train direction (arrow on train with point at front-end location)
5. Mile posts
6. Switches connected to the main tracks
7. Signals
8. Station names
9. Equipment integrity detectors of all kinds, including hot box, dragging equipment, wheel impact, high water and other types of detectors
10. Railway crossings at grade (diamond)
11. Highway crossing at grade (road crossing)
12. Bridges, overpasses, tunnels, etc.
13. Adjacent railways as per operating timetable
14. Regular station stops for this train 15. Conditional station stops for this train
16. Whistle posts where whistling is applicable
17. Train front end location (digital display to nearest tenth of mile)
18. Train rear end location (graphical)
19. Change in method of control (OCS vs. CTC vs. interlocking)
20. Location of yellow over red flag indicating advance warning for area of authority for working party.
21. Location of red flag indicating beginning of area of authority for working party.
22. Location of green flag, indicating beginning of slow order protection.
23. Location of yellow flag, indicating end of slow order protection.
24. In OCS territory, facing point switches to be approached at 50 mph maximum until confirmed to be properly lined for the movement.

The onboard TSS Application provides audio alerts in addition to the visual display alerts for some specific upcoming restrictions, locations, or conditions. Auditory alerts and alarms are digital audio files played on a speaker at a volume loud enough to alert the engineer of upcoming warnings. For alarms, the sound is played until the condition returns to normal. For notification, the sound is played once to direct the crew's attention to the screen for new information.

During regular train operations, LOCs 130 receives GBOs or other restrictions (as by a foreman named in a Planned Protection Rule) by radio. These restrictions are entered into the manual restriction input screen shown as example in FIG. 7.

The manual restriction input screen 700 allows the LOC 130 to enter pertinent restriction information (received, say, over a radio call from the dispatcher) into the TSS Application. The TSS is then able to provide the appropriate instructions to the LOCs at the appropriate time, based on the information entered. The screen is designed to facilitate quick and easy entry of typical information and restrictions provided by radio during operation.

When approaching the applicable restriction location:
  a. The manual restriction input screen 700 shows the GBO information at the bottom of the screen, with visual alert (flashing, colored text) as determined by the alert settings.
  b. Red button restrictions—a STOP entry—activates the braking calculator and an audible alarm
  c. Orange button restrictions generate an audible notification.
  d. Yellow button restrictions show the speed change on the speedometer at the indicated location and activate the braking calculator.

Once the final destination has been reached, the trip operation mode of the TSS ends and the trip close screen displays.

A summary of the trip is provided, comprising one or more of the following:
  a. On-time performance information
  b. The names of the LOCs active upon arrival
  c. A list of warnings and errors generated during the trip.

The TSS application then uploads the trip logs to the TSS central system, enabling analysis and replay of the trip.

The user interface can be a touch screen mounted at each crew work position in the locomotive cab. The user interface also generates audio audible to LOCs within the locomotive cabin while the engine is operating. Audio alerts are also generated and are audible to the LOCs. Other input devices may be required or available, such as a keyboard, pointing device (mouse/trackball), based on the detailed design.

The user interface 135 may further comprise:
1. Any upcoming lower speed maximum (for example, permanent speed restriction, temporary speed restriction, or lower zone speed) is shown two miles before the location of change by a yellow curved line on the inside of the speedometer scale; a notification sound is played.
   a. The distance (numerical) to the point of the speed restriction is shown. Starting at a minimum distance (e.g. two miles), the distance to the upcoming restriction is represented on an animated vertical bar graph, with a predetermined resolution, e.g. $\frac{1}{10}$ mile.
   b. At the location of restriction, the green line on the speedometer is changed to show the new speed limit. At the same time, the next upcoming maximum speed is then shown by the yellow line. (When the next speed maximum is higher, the yellow line it may be decided to remove the yellow line.)
   c. When the speed limit is decreasing from the current limit, the new speed applies as the front end of the train passes the location, but where the speed limit is increasing, the new speed applies when the tail end of the train passes the point of the change. If it is decided that the yellow line is displayed for all speed limit changes, the TSS takes into account the length of the train (computed from the consist information) in determining the point at which the new speed limit is presented. A new higher speed maximum is displayed in green only when the rear end of the train has passed the location of speed change.
2. Signals:
   a. The distance (numerical) to the next signal is shown. Starting at a minimum distance (e.g. two miles), the distance to the upcoming signal is represented on an animated vertical bar graph, with a predetermined resolution e.g. $\frac{1}{10}$ mile.
   b. An audible notification may be sounded at a predetermined distance (e.g., $\frac{1}{4}$ mile) before the signal (this distance may be speed-dependent) and at the signal.
3. Detector notification: At a pre-determined distance before and after any type of detector present on the main track occupied by the train, a flashing detector icon appears on the TSS screen. The distance may depend on the type of detector.
4. Changing railway method of control:
   a. At a pre-determined distance before the territory limit separating different methods of control (e.g. $2\frac{1}{4}$ miles), a visual prompt appears showing the appropriate icon for the upcoming method of control: Occupation Control System (OCS) or Centralized Traffic Control (CTC) or interlocking. An audible notification may be sounded.
5. Braking curves define the fastest speed the train can be moving at each point and still be able to comply with the new maximum speed requirement at the upcoming restriction location OR, where a stop is required, the fastest speed the train can be moving at each point and still stop with sufficient margin at the location defined by the stop restriction, given the train consist.
   Speed is monitored by the braking calculator,
   If the deceleration rate is slower than what is required as calculated by the braking curve, an audible alarm sounds, Following that, if the deceleration rate is still too slow, a continuous louder audible alarm sounds. The alarm is reset if/when the speed is reduced below the braking curve contour or the train stops.

6. Since some speed limit information is conveyed by the signals, TSS gets this information from crew input. An array of six buttons corresponding to the speeds associated with signal indications is shown on the touchscreen (or other input device) to be used as described below.
   a. When approaching a signal, the default speed limit setting (that is, before any entry has been made by the crew) at the location of the current signal shall be 'STOP'
   b. If the train passes the current signal location without the crew making any entry, a continuous alarm sounds.
      To stop the alarm, the LOC does the following within a pre-determined interval (e.g., seven seconds):
      i. Enter speed conveyed by the signal, if known and agreed to by all members of the crew present in the cabin when signal was passed.
      ii. Otherwise, if signal indication cannot be remembered and agreed to by all members of the crew present in the cabin when signal was passed,
         1. The 15-mph button is selected by the LOC. The braking calculator considers the next signal as a restricting signal.
         2. The train immediately slows to restricted speed and approaches the next signal prepared to stop.
      iii. Optionally, if the speed conveyed by the signal OR the 15-mph selection is not input within the specified interval, a penalty brake is applied to stop the train.
   c. The crew continues to follow Railway Operating Rules regarding siting and interpretation of signals (for example, calling the signal to each other). In addition, the TSS requires that they independently interpret the signal to determine the max permissible speed at the following signal as announced by the present signal, and input that speed (CLEAR, 45, 30, 25, 15, STOP, or some subset of these) by pressing the correct button on the button array. Therefore,
      i. At a pre-determined distance before each signal, a set of speed options is presented, one button associated with each speed. Buttons are visibly activated to show which speeds are possible choices for that signal (to a maximum of six). The track database provides the set of possible speeds that can be indicated by each signal (for example, a signal at a 45-mph crossover can show CLEAR [crossover set to straight ahead] or 45 mph [crossover set to change tracks]). The option buttons for all six speeds are present, and the individual speeds in the button array are in the same locations, but only the buttons for speeds possible for this signal are activated.
      ii. Each member of the crew presses the button corresponding to the speed limit at the following signal as announced by the current signal as perceived.
      iii. If the speed selections are entered by the LOC before the signal location is passed, and these values are found to match, then:
         1. the default 'STOP' at the location of the current signal is cancelled
         2. the current speed limit remains as it is, (or is changed to a new value as required by the next PSO, GBO, etc.), and
         3. the speed limit beginning at the location of the following signal is set to the value selected.
   d. If the speed selections entered by the crew do not match, TSS immediately sounds an alarm. The crew has an interval of time (for example, seven seconds) or until the train reaches the location of the current signal, whichever is longer, to enter or re-enter their speed selections. Failure to enter matching speeds before passing the signal results in an immediate loud continuous audible alarm in the cab. If the speed conveyed by the signal is not input within the specified interval, a penalty brake is applied to stop the train.
   f. Generally, as per normal operating rules, if the signal is no longer visible, the LOC must slow the train to 15 mph. If the signal indication cannot be remembered by all members of the crew present in the cab in when the signal was passed, the LOC must select the 15-mph speed. In this case, the braking calculator considers the following signal as a restricting signal. Therefore, as the train passes the signal location:
      i. If at least one selection has been entered, but matching entries have not been received, then if it is not already active, the 15-mph button is activated as an option.
      ii. If matching entries are received within the remainder of the interval, the TSS continues as if these were received before the signal location was passed, except:
      iii. If matching 15-mph entries are made, the speed limit at the current location is changed to 15 mph, and a text message is added to the top of the GBO display indicating that the train immediately reduces to RESTRICTED speed and approach the next signal prepared to stop. The text message is presented with a visual alert, such as yellow or flashing text.
   g. If a crew member changes his/her entry, the TSS updates the response and revises contingencies consistent with the new speed selection. (This allows a crew member to correct an entry that was entered incorrectly as well as allowing entries to be changed in the event that the current signal changes to express a different speed after a first entry has been made.)
   h. A special timing function of ten minutes or more as determined allows TSS Application to operate with a single signal speed input if one of the crew is out of the cabin or otherwise unable to enter a response to the signal.

7. Option to blow whistle at crossing
   If desired, the LOC may select an option so that the TSS Application blows the whistle at crossings where this is required. The whistle automatically blows the cadence associated with a train approaching a crossing from the position of the whistle post until the train fully occupies the crossing. The positions of whistle posts and crossings, along with any special instructions regarding whistling at each crossing, are obtained from the track database. Enabling the whistle automation function does not disable the manual control.

The consist information for the train details the number and type of cars comprising the train. The consist information is used to calculate the length of the train to determine when the tail end passes certain locations, to allow for the LOCs to confirm the clearance of equipment beyond certain locations of track (fouling points) to assure safety, in the calculation of braking curves, and optionally, when possible, to indicate the length of the train in the animation.

The LOC is alerted to specific events or issues in a timely fashion. The TSS application therefore is able to generate alerts and communicate those alerts to the LOC in an appropriate fashion based on the severity and importance of the event that generated the alert.

Audio alerts generated for the LOC take into consideration the noise level and noise spectrum of the locomotive, assuring that the audio alarm is clearly audible and identifiable by the LOC while the train is operating.

Optionally, the system may provide audio playback capability. This is achieved by providing a new audio playback system or through interface to the existing audio playback system in the locomotive cab. In either case, the system needs to meet the requirements below.

Visual alerts are also used, and are integrated into the end-user interface design to assure LOCs are effectively alerted consistent with the severity and importance of the event that generated the alert.

Application of the brakes in circumstances where the train is being operated outside of procedural limits is called penalty braking. In pre-determined situations, the TSS initiates the emergency brakes on the train and brings the train to a stop. The TSS has an interface to the locomotive's braking controls to provide the capability to trigger the brake systems.

As an option, the TSS may also activate the train whistle when it arrives at designated whistle posts. The interface allows the system to activate the whistle appropriately the cadence of the whistle sound is specifically set for different points on the track.

Figure 8:
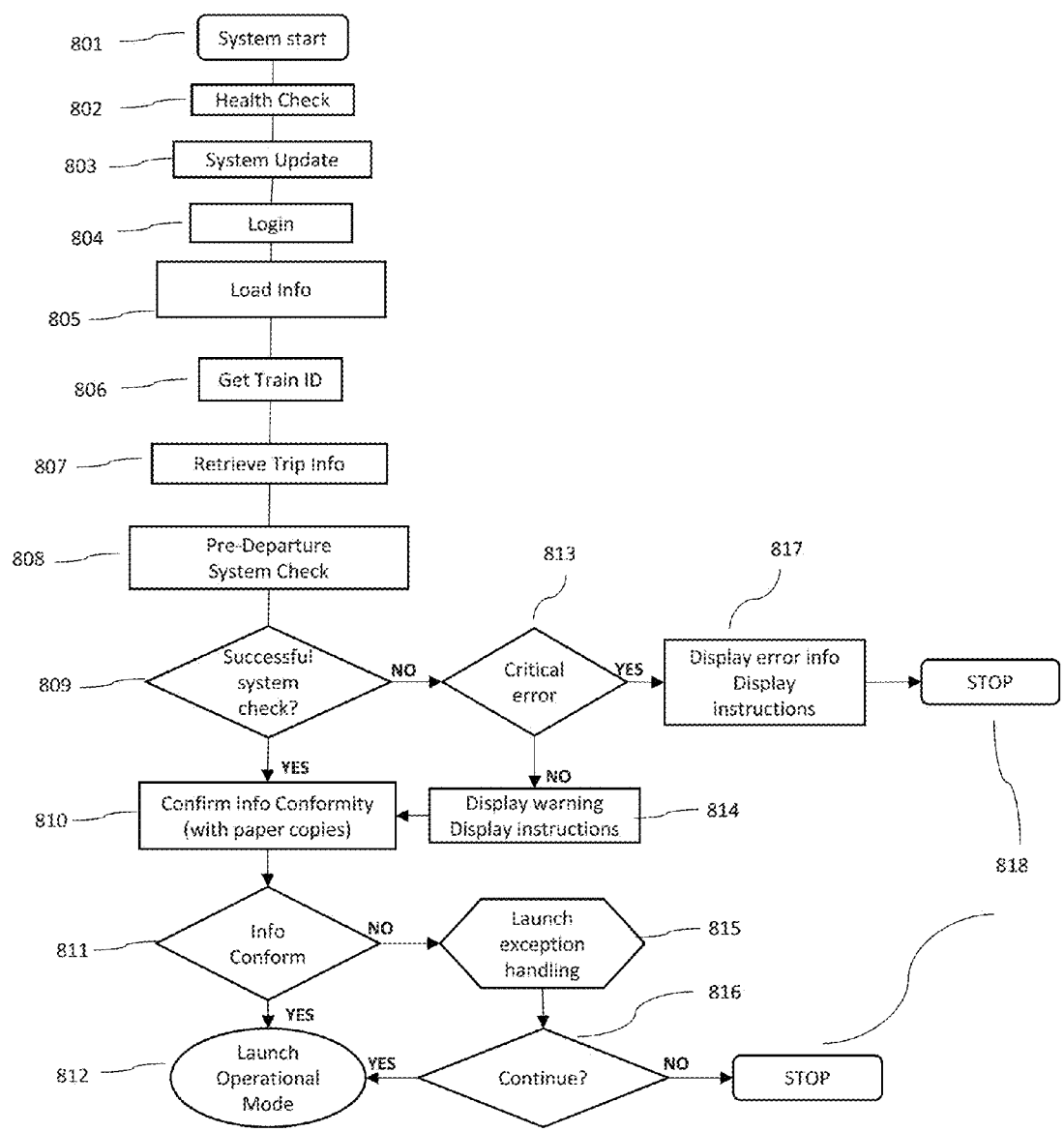
FIG. 8 is the System Initialization Flow Chart.
Figure 9:
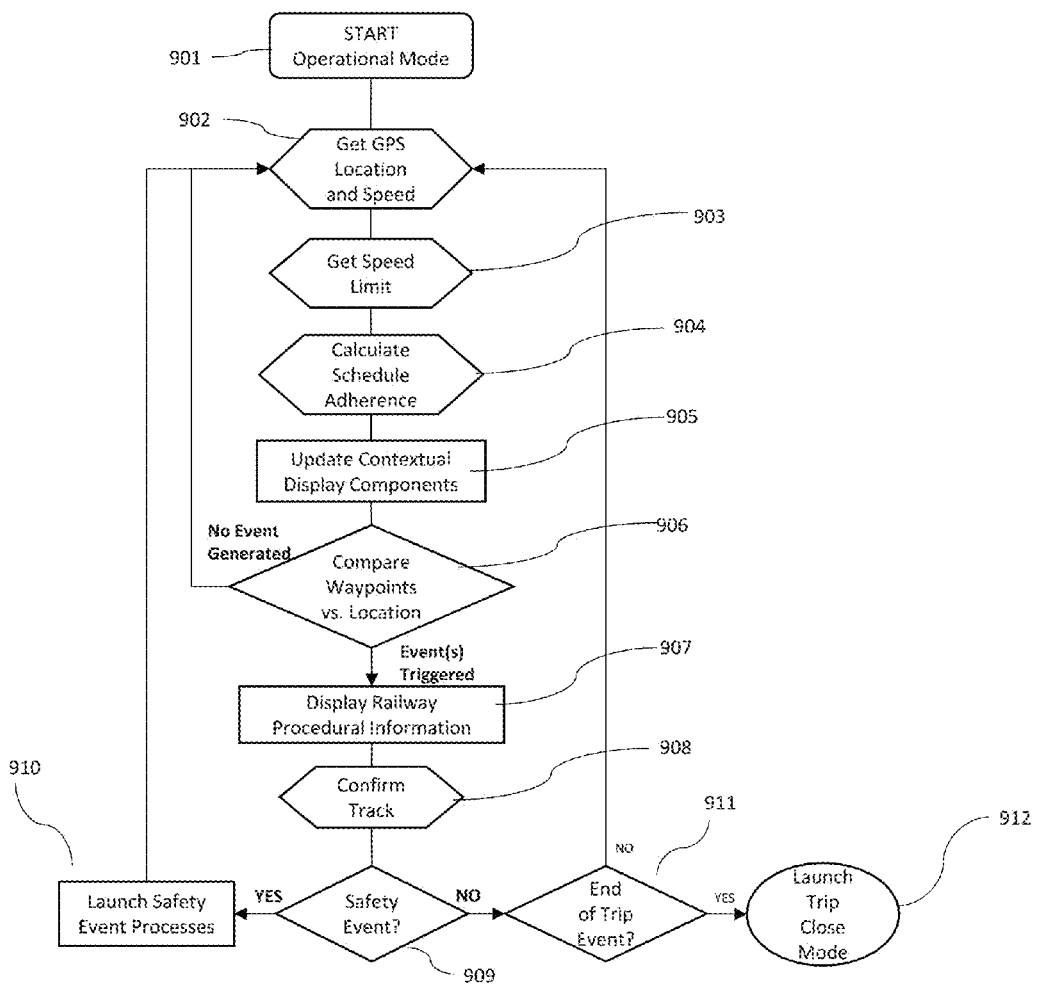
FIG. 9 is the System Operational Mode Flow Chart.
Figure 10:
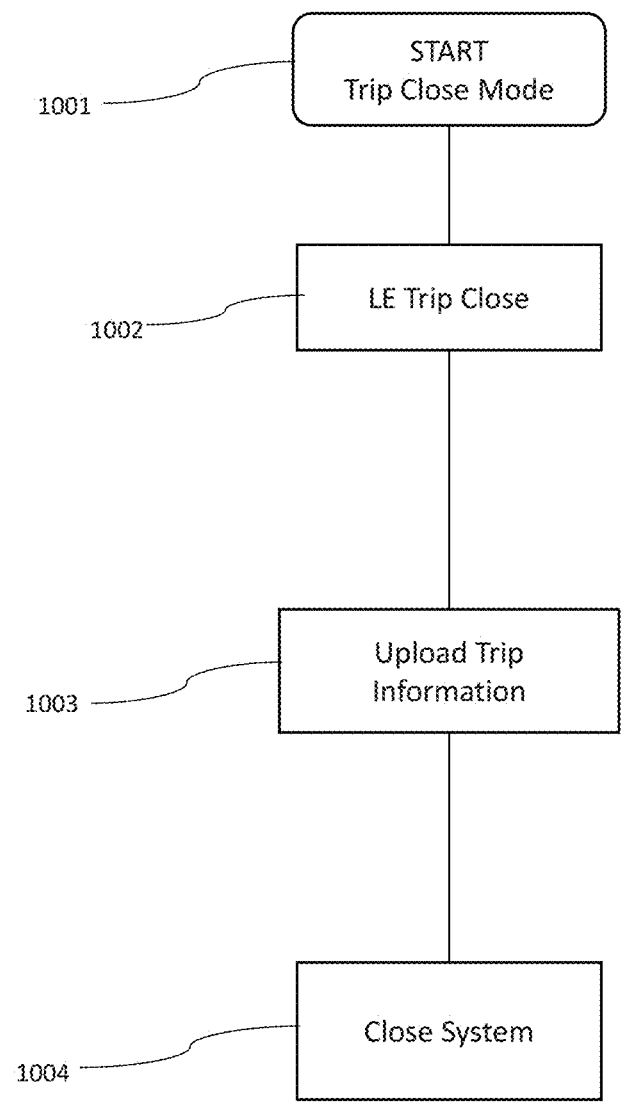
FIG. 10 is the Trip Close Mode Flow Chart.

TSS operation has been described in the form of high level flowcharts showing the process followed for system startup in FIG. 8, operational mode in FIG. 9, and trip close functional sequences in FIG. 10. Each flowchart is accompanied by a detailed functional description that references specific flowchart objects by number, corresponding to the diagram.

System Initialization Flow Chart Details (FIG. 8)
1—System Start 801
LOC initiates TSS startup
2—Health Check 802
System performs a basic health check, including:
  POST, hardware, memory, OS, etc.
  Application components active
  Database integrity
  Interface tests (TSS central server, GPS, train control systems)
  Log results
3—System Update 803
Check for TSS software updates, including applicable sub-systems, from centralized servers
Log results
4—Login 804
Positive identification of end-user (FIG. 4)
Update Log
5—Load Information 805
Train Services Schedule
Tabular General Bulletin Orders (TGBOs), DOBs, etc.
Update waypoints DB
Cross-reference train ID to locomotive number.
Log information loaded/updated
6—Get Train ID 806
Identify which Train ID applies to trip
Based on cross-reference table loaded in previous step.
Confirm with end-user
Provide option for LOC to manually override
7—Retrieve Trip Info 807
Consist information
Number of cars
Car Type
Timetables
8—Pre-Departure System Check 808
System check to be completed prior to commencing trip control, to include the following:
Information for train loaded and up to date
Latest TGBOs received
9—Successful System Check? 809
Analyze whether system check completed successfully
Log results
10—Confirm Information Conformity 810
LOC to compare system information with paper copies to assure system up-to-date.
System to present pertinent information for comparison on-screen, including navigation functionality to facilitate activity.
Multiple sources of TGBO/DOBs are loaded for a specific trip—numerous train dispatcher/operators (RTC Office: Rail traffic controller). This occurs generally when a train goes through multiple jurisdictions.
11—Information Conform? 811
LOC to confirm information conformity
Log LOC's results, identifying source of non-conformity
12—Launch Operational Mode 812
System initiates operational mode with operational interface
Log results
13—Critical Error in System Check 813
Analysis if System Check generated critical error(s)
Log results
14—Display Warning & Display Instructions 814
Details of system check error to be presented to end-user
Instructions/guidance to be presented to end-user
Log information
15—Launch Exception Handling (for Information Non-Conformity) 815
Provide end-user with option to resolve errors with information updates or other pertinent options
Capture user information regarding non-conformity of information
Log results
16—Continue (After Information Non-Conformity Error) 816
Provide end user with option to continue or abort
Log results
17—Display Error Information & Display Information 817
Provide end user error information and pertinent instructions
18—Stop 818
Log error information
System stopped—not operational
FIG. 9 shows the System Operational Mode
1—Start Operational Mode 901
Initiate Operational Mode
2—Get GPS Location 902

Interface with GPS returns current location coordinates and current travel speed
Log GPS location, speed, time, train#
3—Get Speed Limits 903
Identify current applicable speed limit
Retrieve speed limit from PSO (Permanent Speed Order)
Identify applicable speed limit changes due to TGBO, GBO, or other notice.
Identify milepost where speed changes
Identify next applicable speed limit
Retrieve next speed limit from PSO (Permanent Speed Order)
Identify applicable speed limit changes due to TGBO, GBO, or other notice.
4—Calculate Schedule Adherence 904
Calculate Schedule Adherence
Delay, ETA
5—Update Display Components 905
Current Speed
Regular Speed Limit
Applicable Speed Limit
Update Track Diagram/Animation
Schedule Adherence
6—Compare Waypoints vs Location 906
Event Trigger?
If an event is triggered, event information is displayed
If no event, loop back to #2—Get GPS Location
7—Display Event Information (Refer to Appendix A for Detailed List) 907
List all applicable events in sequence
Detail required actions for event, if/as applicable
Play sound for event (if/as applicable)
Log event
8—Confirm Track 908
When appropriate identify on which track the train is traveling
Use technology solution to identify which track
Interactive questions to confirm which track
9—Safety Event? 909
Has a Safety Event been triggered?
Log Safety Event
10—Launch Safety Event Processes 910
Based on Safety Event, perform appropriate actions. Example: Over-speed Safety Event: cut engine power and apply brakes
Log results
11—End of Trip? 911
Evaluate if trip has ended
If no, loop back to #2—Get GPS Location
12—Launch Trip Close Mode 912
Operational Mode ends, system launches Trip Close Mode FIG. 10 shows an example flow chart of the Trip Close Mode
1—Trip Close Mode 1001
Initiate Trip Close Mode
2—LOC Trip Close 1002
Confirm Trip Close
Capture Notes
3—Upload Trip Information 1003
Upload trip information and logs to central TSS system
4—Close System 1004
Close all active windows and systems
Re-launch Application The TSS leverages a local database to store mapping component information and pertinent GBO and TGBO information with corresponding location information. The database, GBOs and TGBOs are updated frequently by the TSS Central System.

Log information is also stored locally, and is retrieved by the TSS Central System on a regular basis (frequency to be determined based on technical capabilities and applicable costs). Logs comprise system health information, update timing, information recording, LOC entries, interfaces/network errors etc.

The TSS central system is an application that receives information from numerous sources, manages this information, provides information updates to the TSS, as well as providing basic administration, management, and reporting tools. The combined system therefore consists of an application server component, a database component, and a web user interface component.

The TSS can show on-time performance information, based on information from a web service. This service can provide the arrival time and on-time performance information.

A list of completed runs is available for replay, indexed by Train #, Origin, Destination, and Date. Other pertinent information is also made available upon request, including identification of the LOC responsible for the train. This is done through a UI for LE and operations management 203, 204.

The TSS application 106 interfaces with one or more of the following systems:
i) TSS Central System 102
ii) Database updates, including:
(a) Mapping components 105
(b) TGBO, GBO 222
(c) Operating timetable information (radio frequencies, etc.)
(d) Authorization information (username/passwords) 401
(e) Train schedule including locomotive and consist assignments 221, 220
iii) Application, system, and OS log information
iv) Application updates (to be confirmed)
v) Business intelligence related data for information consolidation on central system
vi) Locomotive GPS System
vii) Locomotive control systems
(a) Penalty Braking Systems
(b) Whistle
viii) Remote Access ("Remote Desktop" functionality)
ix) Audio output for alerts and warnings The TSS receives constant updates from the GPS installed in the locomotive to get current position and current speed information which is cross-referenced with the GPS-located critical information.

Any particular TSS may be viewed from any PC within the operator's network, with appropriate access controls implemented to assure only authorized users have access.

The operator can optionally have the capability to replay a TSS application experience on any trip made with the TSS installed using the logs generated by the application throughout the application. This replay functionality is supported on standard Windows PCs. The replay provides the complete experience of an LOC on the train, from Trip Initialization to Trip Close.

When trains are approaching or departing major stations, there may be a maze of tracks and switches. Optionally, the system may not provide guidance in moving through these low speed areas. The TSS Application may optionally only begin to give detailed instructions and to display detailed animation of track and infrastructure ahead once the train moves away from the major stations. The LOC is notified when guidance begins.

The TSS application is executed on one computer and one or two touchscreen displays with applicable input devices— one for each of up to two crew members in the locomotive. The computer uses Internet access for certain functions, though TSS Application remains fully operational should network connectivity be temporarily unavailable. Local connectivity is established between the device and train control systems and the locomotive GPS. In the event that the TSS loses network connectivity, the TSS continues to provide full functionality during trips based on its local store of downloaded data.

The system provides automated warnings and reminders by means of rule base alerting strategy by extracting and combining pertinent information while minimizing the LOC's cognitive mental workload.

The TSS can monitor the interactivity of the LOC with the system to detect possible lack of awareness and ensure the LOC respond accordingly. The touch screen capability can help detect mental awareness issues such as, finger tremors indicating tension or fatigue. Sampling of reaction time, attentional focus, and other indicators of awareness, mental sharpness, and fatigue can optionally be performed during off-peak times to ensure the LOCs are maintaining acceptable mental awareness.

The TSS can be used for continuous improvement of LOC training by collecting trip reports, logs of conformance to regulations which can later be reviewed and discussed with the LOC.

The TSS can be used in a network of trains all using TSS by means of informing adjacent train proximity to confirm their right of ways.

The TSS capabilities can be adapted to allow use of a single driver in the cabin as opposed to a two-person LOC.

Communication between the train dispatchers and the operator make use of existing, secure connections when available, or connectivity solutions can be developed with each dispatcher. Options include establishing a VPN connection over the Internet or implementing a direct network link such as an MPLS network connection. Connectivity decisions are made in conjunction with the each individual partner.

Accuracy and precision regarding locations and distance calculations is a prime requirement for the Train Safety Systems. The GPS to be used by the TSS therefore provide specified levels of accuracy and precision and the TSS software compensates for the margin of error provided by the GPS in order to assure the safety of the passengers, cargo, crew, and equipment, as well as the safety of any other organizations and the general public.

The TSS can also calculate the length of the train for safety reasons as it influences the speed allowed at critical locations. As the length is a function of the number of cars, type of cars (provides length), locomotive type (provides length), and GPS placement, the system compensates for inaccuracies to assure safety. GPS placement on the locomotive is not always consistent. Other GPS-based electronic devices, such as end-of-train can also be used to increase the accuracy and reliability of the estimations. When the system is confirming that the train has cleared a fouling point, a margin for error is included in the calculation to assure safety.

Figure 11:
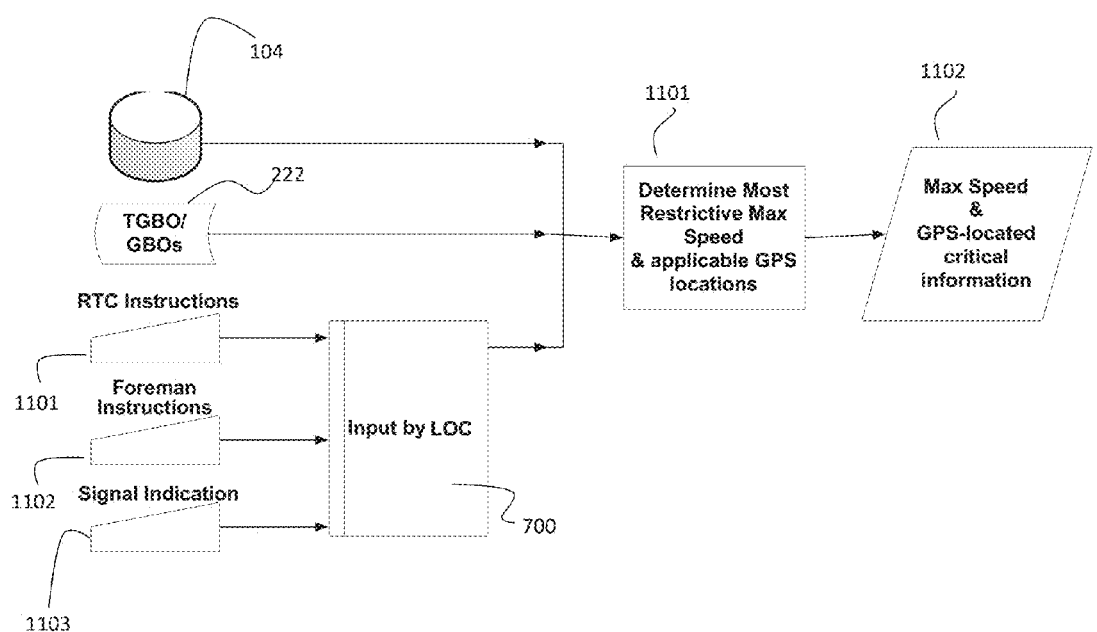
FIG. 11 shows an example of the information flow to calculate maximum speed and GPS-located critical information.

The TSS applies human factors to define an IT-based process to reduce the mental workload (cognitive and memory demands) on the locomotive crew. It provides a method of extracting and combining information from permanent slow orders, temporary slow orders, real-time signal recognition 1103, and instructions conveyed to the crew 700 through the various GBOs 222, foreman's 1102, and dispatcher's 1101 instructions, to identify the speed limit at each point along the route. As per FIG. 11, the TSS may further comprise:

i) Processes 1103 to parse GBO 222 information to extract the instruction type and the milepost where the instruction applies.

ii) GPS coordinates for the visible signals used to control train traffic on the railway (e.g. block signals, panel signals, flags) are obtained and included in the track database 105 to ensure that the location information for speed limit changes is precise. 1104 iii) GPS-located critical information is prioritized based for example on restriction or distance to determine the best order to present information to the crew.

iv) Calculation of speed limit based on the GPS-located critical information to compare with real time monitoring of speed (obtained from either GPS or conventional measurement technology, e.g. the conventional locomotive speedometer) to detect over-speeding and application of brakes to maintain acceptable speed at all times 1102.

v) Logic process (as per FIG. 12, 13) to present speed and other information (location of signals, upcoming railroad and highway crossings, location of switches, sidings, etc.) in the most appropriate order and at the most appropriate time, in an attempt to prevent errors from memory lapse, distraction, competing stimuli, or inattention.

vi) Use of GPS-determined speed for on-going calibration of conventional speed determination, which is useful to ensure the greatest possible range for dead reckoning of position, needed to allow the TSS to continue to operate when the GPS becomes unavailable for any reason.

Figure 12:
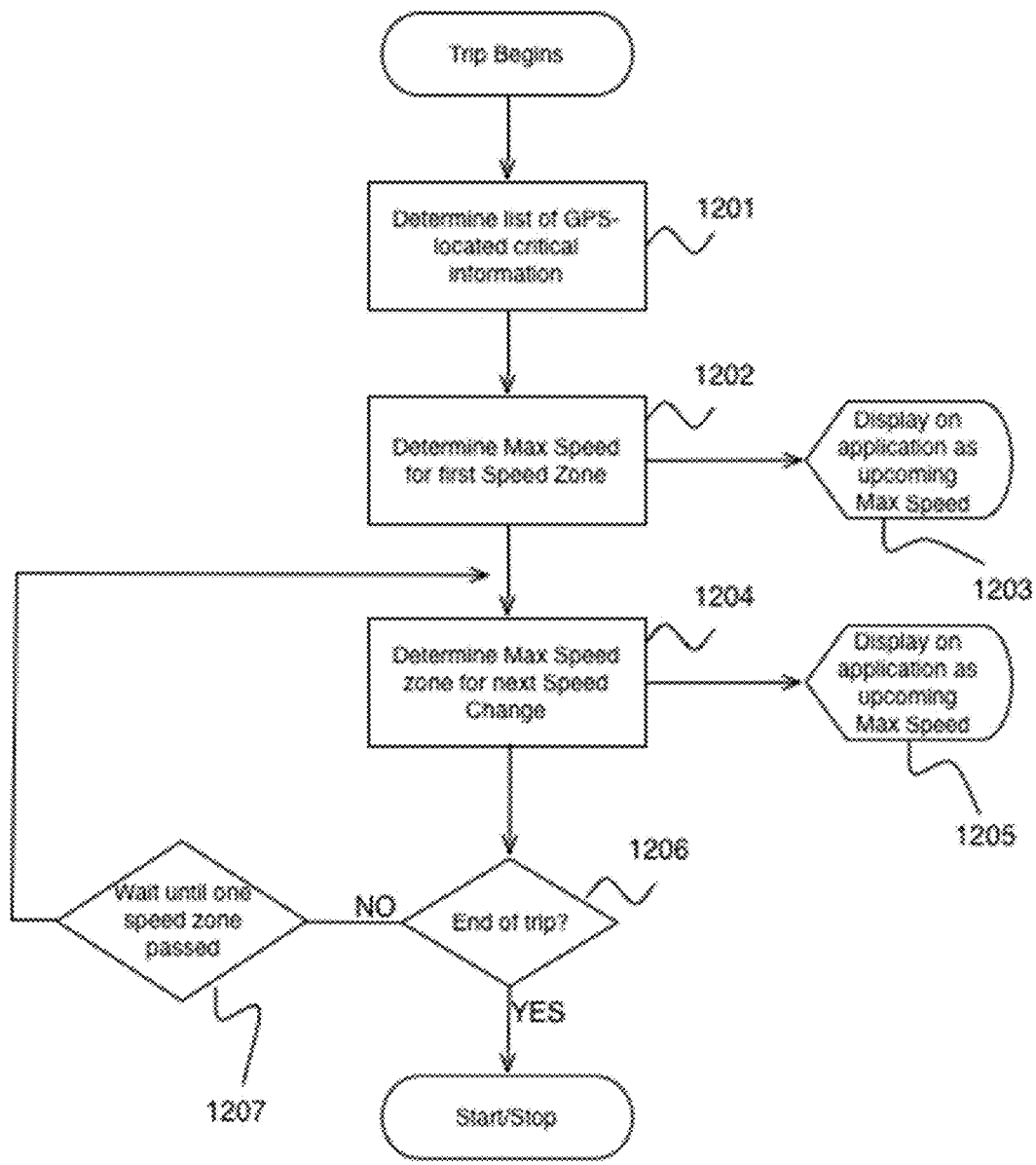
FIG. 12 shows a logic process to display information.

FIG. 12 shows an example of the process used to display the information on the application. When the trip begins, the list of GPS-located critical information 1201 is loaded and sorted. The maximum speed for the first speed zone is determined 1202 and displayed on the application 1205. If the end of the trip is not reached 1206, when the train has gone by the first speed zone 1207 the following speed zone is displayed. In this example the LOC can see two speed zones ahead, but the system could be configured to show any number of upcoming zones.

Figure 13:
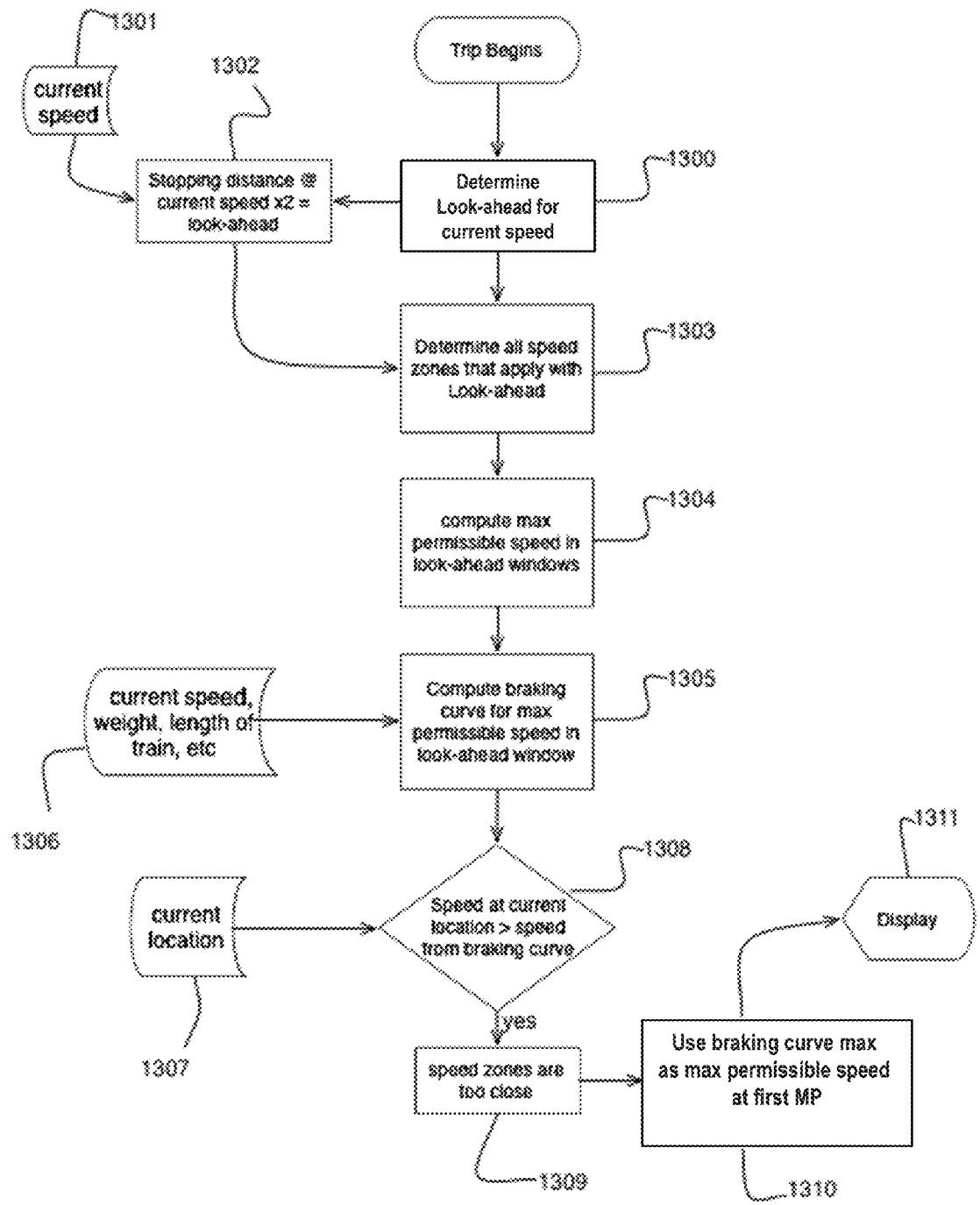
FIG. 13 shows a logic process to look-ahead for upcoming speed.

FIG. 13 shows a process wherein the system looks ahead to ensure there is sufficient braking time to meet future speed zones. The current speed 1301 is used to calculate the look-ahead which is a factor (e.g. 2) times the stopping distance 1302 for the current speed. All speed zones contained within the look-ahead distance 1303 are identified. If there is more than one speed zone in the look-ahead window 1304, and the second next speed limit is lower than the immediately next speed limit, the braking curve for conforming to the second next speed limit from the current speed is calculated 1305, taking into account all relevant information about the train consist, etc. If the braking curve shows that the speed required to maintain safe operation of the train across the boundary of the second next speed zone would require a slower speed at the location of the start of the immediately next speed zone, then the speed zones are deemed to be too close together and the speed limit for the immediately next speed zone is set to the speed determined for that location by the computed braking curve 1310, and that adjusted value is displayed on the application.

Figure 14:
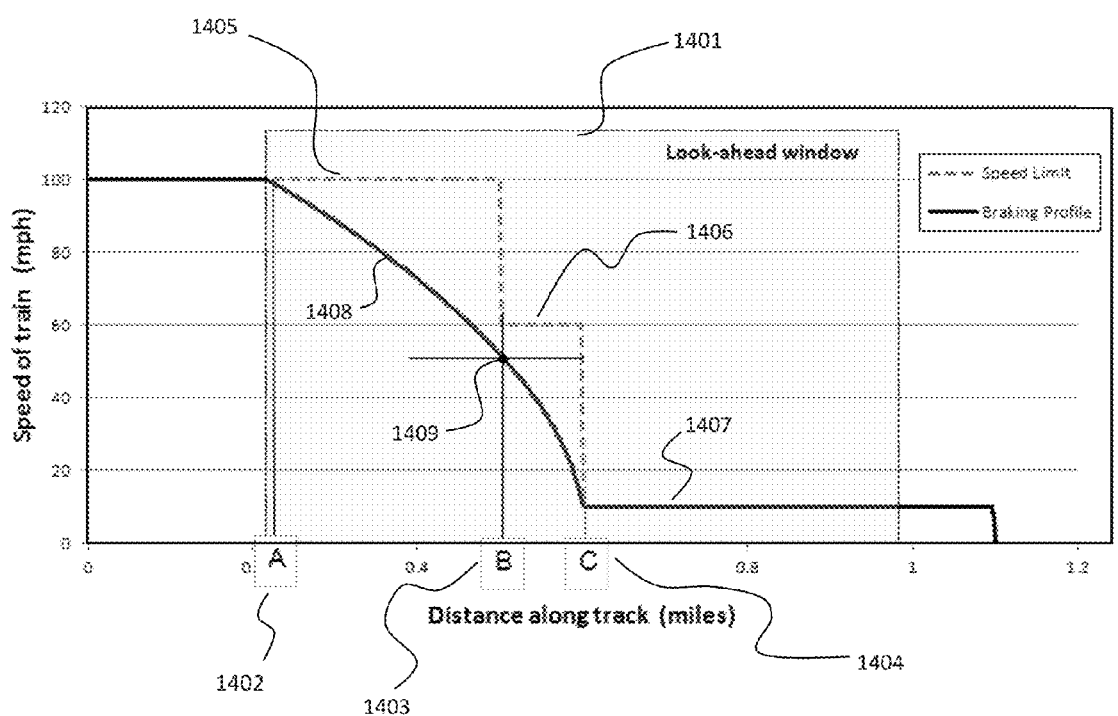
FIG. 14 shows an example of a breaking curve with look-ahead.

FIG. 14 shows an example of a look-ahead window 1401 that has found speed limits that are too close together. The look-ahead is based on a window twice the stopping distance of the starting 100 mph speed of the train. Speed zones A 1402, B 1403 and C 1404 are displayed along with their corresponding speed limits 1405, 1406, 1407. The braking profile is calculated 1408, and the lower speed of the braking profile and the limit is used for the speed zone B 1409: the speed zone limit 1406 is 60 km/h but the braking profile 1408 requires the train to be at a speed no greater than 50 km/h 1409 at that same location in order to comply with the next speed limit 1407 at speed zone C.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A safety system for a train having a locomotive operating crew, said system comprising:
   a database containing one or more railroad maps and one or more train dispatcher information systems;
   a central server adapted to be at least intermittently coupled to said database to generate GPS-located critical information;
   a GPS device on-board the train to monitor the real-time location of the train; and
   a computer on-board the train and adapted to be at least intermittently coupled to said central server and said GPS device for executing an application utilizing said GPS-located critical information and said real-time location of the train;
   wherein said application
      generates alerts for said locomotive operating crew based on the GPS-located critical information and the real time location of the train, so that the crew is alerted as to upcoming changes to be implemented, and
      identifies a maximum permissible speed for said train at each point along a predetermined route for the train based at least in part on said GPS-located critical information, and
   at least one of said application and said central server is adapted to detect a type of equipment included in a consist, and to generate a maximum permissible speed based on said type of equipment.

2. The safety system of claim 1 which includes one or more network interfaces between said central server and said on-board computer for communications between said on-board computer and said central server to maintain the GPS-located critical information up to date.

3. The safety system of claim 1 in which said maximum permissible speed is combined with speed limits entered into said on-board computer by said crew, to establish an allowed speed at a selected GPS location.

4. The safely system of claim 1 in which said on-board computer receives information representing the actual speed of said train, and said application generates an alarm when said actual speed exceeds said maximum permissible speed.

5. The safety system of claim 1 in which said on-board computer generates alarms when a railroad signal is passed without acceptable speed selections being made by said crew.

6. The safety system of claim 1 in which at least one of said application and said central server use dead reckoning to determine the real-time location of said train if said GPS device cannot determine the real-time location of said train.

7. The safety system of claim 1 in which at least one of said application and said central server is adapted to receive manual input of GPS-located critical information.

8. The safety system of claim 1 in which at least one of said application and said central server is adapted to receive input from a train dispatcher while the train is running.

9. The safety system of claim 8 in which said input comprises information sent over a radio or other communication means to said crew.

10. A method of assisting the safe operation of a train adapted to be operated by a locomotive operating crew, said method comprising
   generating GPS-located critical information at a central location, said GPS-located critical information being based at least in part on one or more railroad maps and one or more train dispatcher information systems;
   monitoring a real-time location of the train with a GPS device on-board the train;
   generating alerts for said locomotive operating crew based on the GPS-located critical information and the real time location of the train, so that the crew is alerted as to upcoming changes to be implemented, identifying a maximum permissible speed for said train at each point along a predetermined route for the train based at least in part on said GPS-located critical information, combining said maximum permissible speed with speed limits entered into said on-board computer by said crew, to establish an allowed speed at a selected GPS location, and at least one of said application and said central server detects a type of equipment included in a consist, and generates a maximum permissible speed based on said type of equipment.

11. The method of claim 10 which includes maintaining the GPS-located critical information up to date with communications between said on-board computer and said central server to maintain.

12. The method of claim 10 which includes combining said maximum permissible speed with speed limits entered into said on-board computer by said crew, to establish an allowed speed at a selected GPS location.

13. The method of claim 10 in which said on-board computer receives information representing the actual speed of said train, and said application generates an alarm when said actual speed exceeds said maximum permissible speed.

14. The method of claim 10 in which said on-board computer generates alarms when a railroad signal is passed without acceptable speed selections being made by said crew.

15. The method of claim 10 in which at least one of said application and said central server use dead reckoning to determine the real-time location of said train if said GPS device cannot determine the real-time location of said train.

16. The method of claim 10 in which at least one of said application and said central server receives manual input of GPS-located critical information.

17. The method of claim 10 in which at least one of said application and said central server receives input from a train dispatcher while the train is running.

* * * * *